L. LYNDON.
ELECTRODE PLATE FOR STORAGE BATTERIES.
APPLICATION FILED APR. 30, 1919.

1,390,629.

Patented Sept. 13, 1921.

Witnesses.
H. L. Fisher.
William A. Hardy.

Inventor:
Lamar Lyndon
By Delos Holden

UNITED STATES PATENT OFFICE.

LAMAR LYNDON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

ELECTRODE-PLATE FOR STORAGE BATTERIES.

1,390,629.   Specification of Letters Patent.   Patented Sept. 13, 1921.

Application filed April 30, 1919. Serial No. 293,793.

*To all whom it may concern:*

Be it known that I, LAMAR LYNDON, a citizen of the United States, and a resident of West Orange, Essex county, New Jersey, have invented certain new and useful Improvements in Electrode-Plates for Storage Batteries, of which the following is a description.

My invention relates to electrode plates for storage batteries, and is especially directed to an improved form of negative element or electrode plate for batteries of the Edison type wherein an alkaline electrolyte is employed and in which the positive elements contain flake nickel and nickel hydroxid and the negative elements contain electrolytically active finely divided iron or oxid of iron.

In batteries of the Edison type as now made, the negative elements or electrodes comprise comparatively heavy apertured grids formed of nickel plated sheet steel and a plurality of flat pockets containing finely divided iron or oxid of iron respectively mounted in the apertures of such grids. These pockets are each made up of two substantially rectangular telescoping sections formed of very thin perforated nickel-plated steel, which, after being filled with the active material, that is, the iron or iron oxid, are placed in the openings or apertures of the grid and then subjected to great pressure to force the active material into intimate contact with the walls of the pockets and the pockets into contact and clamping engagement with the walls of the grid openings. The contact thus formed between the pockets and the grids is indeterminate and varies considerably in different electrode plates and with individual pockets in the same plate, and the differences in capacity in Edison cells which are identical in size, construction and materials, are largely due to this varying contact.

The principal objects of my invention are to provide an improved form of negative electrode plate, wherein the foregoing objection will be obviated, and which is much more simple and economical to manufacture than the form of electrode plate now used.

My invention also resides in the method of making my improved electrode plate.

Other objects and features of my invention will be hereinafter more specifically described and claimed.

In order that my invention may be more clearly understood, attention is directed to the drawing accompanying and forming part of this specification, and in which.

Figure 1:
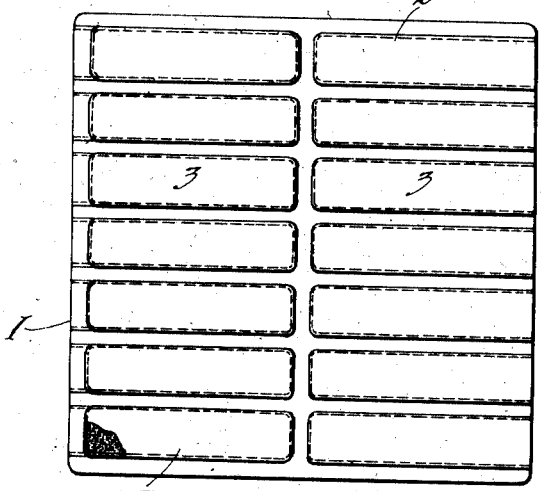
Figure 1 is a view in side elevation of a partially completed electrode plate in accordance with my invention, the series of pockets of the right half of the plate being shown unloaded and with their outer ends open, and the series of pockets of the left half of the plate being shown filled with active material and with their outer ends closed.
Figures 2, 5:
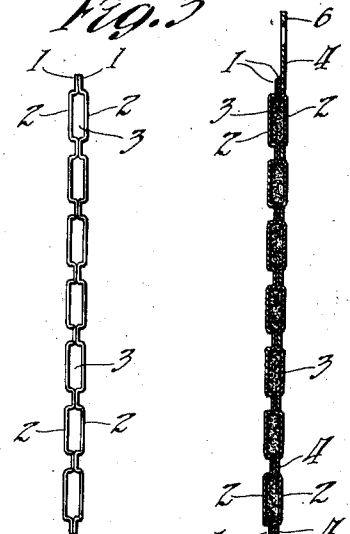
Fig. 2 is an end elevation of the electrode plate element shown in Fig. 1 looking from the right.
Fig. 5 is a sectional view taken on line 5—5 of Fig. 4.

Referring especially to Figs. 1 and 2, the partially completed negative electrode plate element shown therein consists of a pair of similar and substantially rectangular sheets 1, 1, each of the same width and length as the finished electrode plate. Each of the sheets 1, 1 is provided with two similar series of equi-spaced horizontal equal sized rectangular grooves or pocket sections 2, horizontal flat ribs between the grooves or pocket sections and at the top and bottom of the sheet above and below the grooves or pocket sections, and a central vertical flat rib between the two series of pocket sections, all of which ribs are in a common plane. The grooves or pocket sections 2 may be formed in each of the sheets 1, 1 either by rolling or in a press; if by rolling, the rolls are mutilated to produce the ribs, while if in a press, the dies are shaped to form the ribs. The two series of grooves or pocket sections as formed in each sheet 1 respectively extend to the opposite side edges of the sheet. After forming the pocket sections 2 therein, the two sheets 1, 1 are suitably secured together, as by welding the corresponding ribs thereof together, with the said pocket sections respectively registering, whereby the plate element so formed is provided with two vertical series of horizontal integral pockets 3, 3. The outer ends of these two series of pockets will now be respectively open at the opposite side edges of the plate element, as shown in Fig. 2, and at the right-hand side of Fig. 1. The plate element is now placed in a suitable clamp or holder so that the latter will hold the plate member in a vertical position with the ends of one series of pockets uppermost, and the pockets of such series are then loaded with suitable active material, such as finely divided electrolytically active iron or oxid of iron, in the usual manner. The end portions of the loaded series of pockets are then pressed flat, thereby closing the ends of such pockets, as by means of a suitable crimping attachment with which the said clamp or holder may be provided. The plate member, which will now have one series of completely closed, loaded pockets and one series of open-ended unloaded pockets, as shown in Fig. 1, is then reversed in the clamp or holder; that is, it is mounted in the holder in a vertical position and so that the open ends of the unloaded series of pockets will be uppermost, and the latter series of pockets are then loaded and closed at their ends in the same manner as the first series of pockets.

The entire sides or faces of all the pockets 3, 3 are provided with very small and closely adjacent perforations, as in the case of the usual form of negative pockets employed in Edison batteries. These perforations may be made at the same time as the grooves or pocket sections 2 are formed in the sheets 1, 1, that is, the grooving and perforating steps may be performed simultaneously; or the perforating may be performed as a separate step either before or after the grooving of the sheets. Preferably, however, the faces of the pockets are perforated after the pockets are loaded, as this greatly increases and improves the contact between the active material and the plate element and also adds to the porosity of the active material. In all cases, the perforations are so formed that the burs produced will extend inwardly of the pockets.

Figure 3:
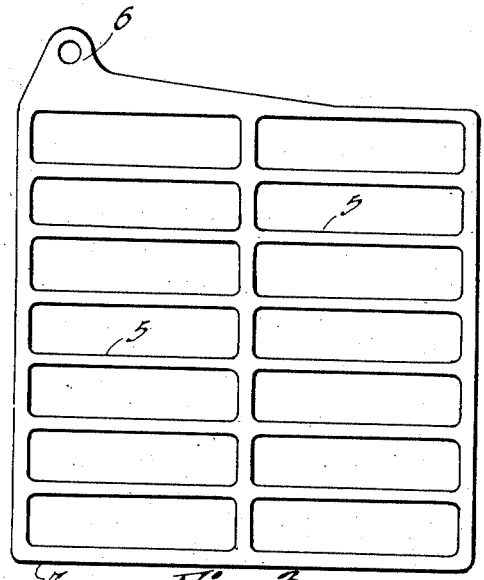
Fig. 3 is a side elevation of the reinforcing or strengthening grid comprising a part of my improved electrode plate.

In order that the sheets 1, 1 may be properly perforated, they must be comparatively thin, preferably not more than .12 inch or 3 mils. in thickness. Accordingly, the plate element or member composed of the two sheets 1, 1 and provided with the loaded pockets 3 will be quite flexible and weak and must be stiffened and strengthened, for which purpose I employ the grid 4 shown in Fig. 3. This grid is of the same width and length as the sheets 1 and 2 and is formed, as by stamping, with two vertical series of rectangular horizontal openings 5 corresponding to the series of pockets 3 and only slightly larger than said pockets, whereby the grid will be formed with ribs corresponding to the ribs at the edge portions of the plate member or element, and between the pockets 3 of such plate element. The grid 4 is relatively thick and strong and as in the case of the sheets 1, 1, is preferably made of nickel-plated sheet steel, both the grid and the sheets 1, 1 therefor being inactive and insoluble in an alkaline electrolyte.

Figure 4:
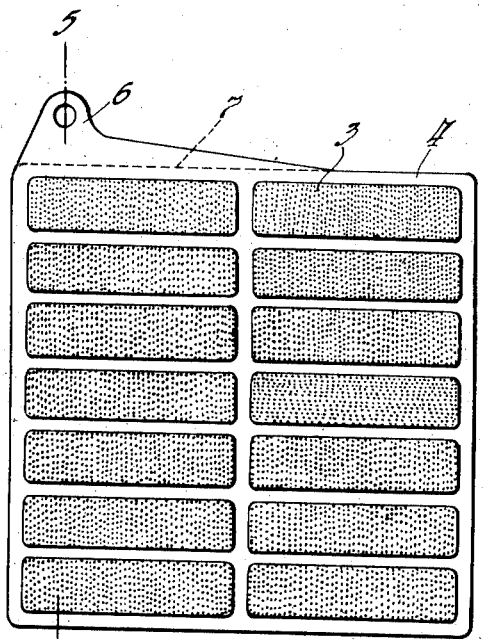
Fig. 4 is a view in side elevation of the completed electrode plate.

The grid 4 is now placed against one side of the plate element, so that the openings 5 take over the pockets 3 thereof and the ribs of the grid lie against the corresponding ribs of the plate element, and is then suitably secured to the latter as by welding the said ribs together. The structure thus formed is then placed in a hydraulic press where the pockets 3 are subjected to a great pressure to compress the same and the active material therein and to force such material into intimate contact with the walls of the pockets. The electrode plate is now complete, being of the form shown in Fig. 4, and ready for use in a cell, the grid 4 thereof being provided with an apertured lug or projection 6 to enable the plate to be properly mounted and electrically connected with similar plates in the cell.

In connecting the sheets 1, 1, and the plate element thus formed with the grid 4, the ribs of these members may be secured together either by spot welding or by continuous welding, preferably the latter, in which case these flat sheets or members are passed between two current carrying rollers.

My improved electrode plate is much less expensive to make than the present form of negative plate employed in Edison cells. In the first place, the thin narrow steel strips or ribbons from which the individual pockets of the present type of plate are formed cost more per pound than the sheet metal from which the sheets 1, 1 of my improved plate are formed; and in the second place, the manufacturing operations are greatly simplified and cheapened, as the forming of a plurality of pockets in sheets such as the sheets 1, 1 and the perforating of the faces of such pockets may be done much more cheaply and quickly than the stamping of individual pockets and the perforating of narrow strips or ribbons; and furthermore, the manually performed steps of assembling pockets, placing individual pockets in loading clamps, and assembling the loaded pockets in grids are entirely eliminated.

Electrically, my improved electrode plate is much superior to the present form of negative plate employed in Edison cells, because the active material is directly held in contact with integral parts of the plate and hence there is no loss or variance in capacity due to improper and varying contact between individual pockets and grids carrying the same. This superiority is especially marked at high rates of discharge.

It may sometimes be deirable to have the pockets disposed vertically, and in such cases plate elements consisting of two connected sheets such as the sheets 1, 1 with two horizontal series of loaded vertical pockets may be made up in units in the manner described herein, and one, two or any number of such units spot-welded to a grid to form an electrode plate of any size and capacity desired.

While my invention is particularly directed to an improved form of negative electrode plate for Edison storage batteries, it is to be understood that the same is adaptable to batteries of other types and that it may also be utilized for the positive electrodes. It is also to be understood that the specific form of electrode plate shown and described herein as well as the method of making the same, are subject to numerous changes and modifications without departure from the spirit of the invention and the scope of the appended claims.

Having now described my invention, what I claim as new and desire to protect by Letters Patent is as follows:—

1. An electrode plate for storage batteries, comprising a pair of thin sheets connected together and provided with integrally formed opposed registering pocket sections, whereby the plate element so formed is provided with a plurality of pockets for the active material, and an apertured grid rigidly secured to said sheets with the openings thereof respectively taking over said pockets, substantially as described.

2. An electrode plate for storage batteries, comprising a pair of connected thin metallic sheets, a plurality of perforated pockets each consisting of two sections respectively formed integrally with said sheets, and an apertured grid rigidly secured to said sheets with the openings thereof respectively taking over said pockets, substantially as described.

3. An electrode plate element for storage batteries employing an alkaline electrolyte, comprising two inactive and insoluble thin sheets, each formed with a plurality of integral perforated pocket sections, said sheets being secured together with the pocket sections thereof respectively registering so as to form a plurality of pockets, said pockets containing active material, substantially as described.

4. An electrode plate for storage batteries employing an alkaline electrolyte, comprising two inactive and insoluble thin sheets, each formed with a plurality of integral perforated pocket sections, said sheets being secured together with the pocket sections thereof respectively registering so as to form a plurality of pockets, said pockets containing active material, and an apertured grid rigidly secured to said sheets with the openings thereof respectively taking over said pockets, substantially as described.

5. In an electrode plate for storage batteries, a plate element comprising a pair of similar sheets provided with projecting pocket sections and with ribs located in a common plane disposed between said sections, said sheets being disposed with the corresponding ribs thereof in engagement and with the pocket sections thereof respectively opposed to and registering with each other, and a grid formed with openings and ribs corresponding respectively to the pocket sections and ribs of said sheets, said grid being disposed against said element with the openings thereof respectively taking over the pocket sections of one of said sheets and the ribs thereof respectively engaging the corresponding ribs of said sheet, some at least of the corresponding ribs of said sheets and grid being rigidly secured together, substantially as described.

This specification signed this 22nd day of April, 1919.

LAMAR LYNDON.